(12) United States Patent
Schabel

(10) Patent No.: US 6,712,097 B1
(45) Date of Patent: Mar. 30, 2004

(54) METHOD AND APPARATUS FOR PREVENTING RESIDUAL WATER FORMATION

(76) Inventor: Steve Schabel, 215 Rte. 10 East, Building #1, Randolph, NJ (US) 07869

( * ) Notice: Subject to any disclaimer, the term of this patent is extended or adjusted under 35 U.S.C. 154(b) by 0 days.

(21) Appl. No.: 10/378,648

(22) Filed: Mar. 5, 2003

(51) Int. Cl.[7] ................................................ F16L 55/00
(52) U.S. Cl. ......................... 138/89; 138/97; 206/443
(58) Field of Search ............................ 138/89, 90, 97; 434/365; 206/443, 446, 523; 40/313; 81/177.4

(56) References Cited

U.S. PATENT DOCUMENTS

| | | | |
|---|---|---|---|
| 3,338,499 A | | 8/1967 | Gilbert |
| 3,496,952 A | * | 2/1970 | Amendola .................... 137/67 |
| 4,203,604 A | * | 5/1980 | La Grange .................. 473/162 |
| 4,279,343 A | * | 7/1981 | Alfanta ........................ 206/582 |
| 4,357,960 A | | 11/1982 | Han ............................. 138/97 |
| 4,739,799 A | | 4/1988 | Carney et al. ................. 138/89 |
| 4,863,655 A | | 9/1989 | Lacourse et al. .............. 264/53 |
| 5,035,930 A | | 7/1991 | Lacourse et al. ........... 428/35.6 |
| 5,043,196 A | | 8/1991 | Lacourse et al. ........... 428/35.6 |
| 5,186,214 A | | 2/1993 | Savard ......................... 138/89 |
| 5,207,011 A | * | 5/1993 | Coulthard .................... 40/594 |
| 5,318,075 A | | 6/1994 | Roll ............................. 138/89 |
| 5,497,793 A | * | 3/1996 | Kubica ........................ 131/331 |
| 5,498,224 A | * | 3/1996 | Kauffman et al. ............. 493/39 |
| 5,643,076 A | * | 7/1997 | Heurman et al. ............ 452/176 |
| 6,070,909 A | * | 6/2000 | Kaufman ..................... 281/37 |

* cited by examiner

Primary Examiner—Patrick Brinson
(74) Attorney, Agent, or Firm—James R. Thein

(57) ABSTRACT

A method and apparatus for blocking residual water lingering in pipes after the water has been shut off and substantially drained in a residential or commercial establishment just prior to soldering. A water soluble, able to disintegrate, low density, compressible, resilient, expanded starch based composition is used in combination with a residual water prevention kit which can be stored for extended lengths of time and carried with other soldering tools such as inside a tool box or in a pocket. A mat display apparatus made of the same or similar composition provides a scale of removable plugs for use on pipes having different diameters.

7 Claims, 2 Drawing Sheets

METHOD AND APPARATUS FOR PREVENTING RESIDUAL WATER FORMATION

BACKGROUND OF INVENTION

The present invention relates to water pipe repair and handling residual water during repair operations. When repairing or working on water lines a common method of connecting pipes and fittings is through soldering the joints. Leaks that occur during soldering are often a result of moisture in the pipe. Moisture can make it difficult or impossible to adequately heat the joint; can lead to improper flux coverage; and can form steam pin holes through the solder joint; all these factors can contribute to joints that ultimately fail.

Before a repair can take place, the water supply must be turned off and the pipes must be drained. Most plumbing systems are comprised of numerous pipes connected in various lengths, diameters, and angles. The layout combined with internal friction can make it nearly impossible to completely drain all the water prior to repair.

Residual water can act as a heat sink, dissipating the heat that is supplied by the soldering torch. This action prevents the joint from reaching a temperature that allows the solder to melt and be properly drawn into the joint. The end result often is an inadequately soldered joint that needs to be disassembled, cleaned and prepared for another soldering effort.

Also, the application of flux is necessary to aid in capillary action necessary to properly draw solder into the joints. Flux is applied to the surface of the metals being joined prior to applying heat. In the presence of moisture it is often necessary to apply heat for an extended period of time in an effort to overcome the heat dissipation effect of the water. This prolonged heating often results in the flux being prematurely melted and dispersed. At this point, even if the joint is able to reach a temperature where the solder will melt, the benefits of the flux will be reduced or eliminated and the resulting repair will not be strong and leak-free.

Finally, the introduction of heat to residual moisture can create steam which bubbles through the solder joint, forming tiny pin holes, resulting in a failed joint.

All of these difficulties encountered because of residual moisture can make a simple repair a frustrating and time consuming activity.

One prior art method to overcome the above problems requires the use of common house-hold bread. A portion of bread is placed in the pipe prior to repair. Bread is of an open-cell structure which will act as a sponge, soaking up the water during the repair. The bread is dispersed when the water flow resumes and forced out of the lines through the faucets, aerators etc . . . . However, bread is an open cell, non-resilient structure that readily compacts. Upon insertion, due to its inability to be resilient, the portions used will vary. This can lead to using too much bread, increasing the density of the mass inserted into the pipe. This increased density greatly decreases its ability to readily dissolve or disintegrate, leading to wads remaining in tact in the system which need to be manually removed at the faucets, aerators, etc . . . . Other properties of bread make it inconvenient. Moisture readily evaporates from bread diminishing any slight resilient characteristics it may have had, leaving a hard, crumbly product, unsuitable to effectively seal a pipe. Also, any bread used should be white and not contain crust to minimize density and aid in dispersal. Further, bread usually molds in 15 days or less of purchase and mold should not be introduced into drinking water.

Other types of plugs have been used to eliminate water, or the atmosphere, prior to bonding. Various methods are noted in U.S. Pat. Nos. 3,338,499, 5,186,214, and 5,318,075.

The method described in these patents are unsatisfactory because they all lack the structural property of being resilient and at the same time being formed of a predetermined density and quantity of material which is readily soluble in water.

U.S. Pat. No. 3,338,499 relies on pipes smaller than 2 inches in diameter being stuffed with wads of sheet material. Most water pipe installed, other than main lines, inside residential homes and commercial buildings is less than 2 inches in diameter. U.S. Pat. No. 3,338,499 does not allow a predetermined quantity to be used to effectively seal the internal diameter of a pipe of pipes less than 2 inches in diameter. Often, a wad of plastic sheet will not effectively seal a circular diameter and further its lack of resiliency will again lead to overuse. The resulting, relatively high density wad will encounter difficulties with the effectiveness and just as importantly with solubility and dispersal. Also, U.S. Pat. No. 3,338,499 suggests using corrugated water soluble plastic sheet end capped with water soluble plastic sheet to plug pipes over 2 inches in diameter. This structure may be feasible for the greater water flow encountered in large pipes but the use of sheet material, combined with corrugated sheet material, in pipes less than 2 inches would lead to solubility problems due to the decreased volume of water flow.

U.S. Pat No. 5,186,214 is of a fibrous material held together by a wax material and asphalt sealant. The fibrous cellulose material is not resilient enough to allow it to function without the aid of a sealant and wax binder. Designed for an oil pipeline wax and asphalt may not cause a problem, however, in a cold water line wax and asphalt are dense, insoluble and would not be suitable to potable water.

U.S. Pat. No. 5,318,075 relies on a molded, plastic plug with a solid side wall thickness of 0.025 inches. This patent states that with a minimum end wall thickness of 0.0064, room temperature water still takes 2 minutes 12 seconds to break through. Cold water lines would take much longer to break down the thicker 0.025 inch solid side walls and invariably the aerators, faucets etc . . . would be clogged and adversely affected. While U.S. Pat. No. 5,318,075 may be compressible and resilient, leading to predetermined quantities being used, the density and solubility of a solid molded plastic would adversely affect pipes, aerators, etc . . . .

Finally, U.S. Pat. No. 4,357,960 relies on bentonite clay to absorb residual water and swell, using starch as a binder to aid its application. The absorbing action of bentonite clay vaguely mimics the absorption function of bread. However, its lack of resiliency also lends itself to similar short comings. Both bentonite and alginate materials are tiny particulates that must be pre-moistened and inserted into the pipe. The resulting plug is not of a predetermined quantity, has difficulty forming to the edges of a circular interior and the binders do not lend adequate form to the plug. The plug generally crumbles. This lack of form and its relatively high density greatly limits its convenience and application.

SUMMARY OF INVENTION

It is the object of the present invention to provide a method of preventing residual water from passing into an area selected for repair.

It is another object of the present invention to provide a novel composition for preventing residual water from passing into an area selected for repair.

It is still another object of the present invention to provide an expanded, low density, compressible, resilient, water soluble and dispersible starch based plug, inserted into an open end of a pipe section which has been substantially drained of water in order to block the flow of water into said area of said pipe selected for repair.

Another object of the present invention is to provide a mat display apparatus having a plurality of removable die cut plugs used for preventing the flow of residual water into a repair area.

The present invention is directed to a method and apparatus for blocking residual water lingering in pipes after the water has been drained in a residential or commercial establishment prior to and during repair. The invention is further directed to a novel expanded starch plug used to block residual water, and then disintegrate and readily dissolve after the repair has been made to avoid any major clogging in pipes or accessories. The novel composition is formed to a relatively low density to enable it to readily disintegrate and dissolve. Further, it is compressible and resilient allowing predetermined quantities to be friction fit inside a pipe, aiding in both its application and dispersal. It is conveniently die cut to effectively block various diameter pipes, can be stored for extended lengths of time, and carried with other soldering tools such as inside a toolbox or in a pocket.

DETAILED DESCRIPTION OF DRAWINGS

DETAILED DESCRIPTION OF THE PREFERRED EMBODIMENT

The present invention relates to a method and apparatus for blocking residual water lingering in pipes after the water has been shut off and substantially drained in a residential or commercial establishment just prior to repair and readily dissolving or disintegrating after repair. The invention further relates to a residual water prevention kit which can be stored for extended lengths of time and carried with other plumbing tools such as inside a tool box or in a pocket. The invention also relates to a tool for inserting a specifically designed substance into pipes having different diameters.

Figure 1:
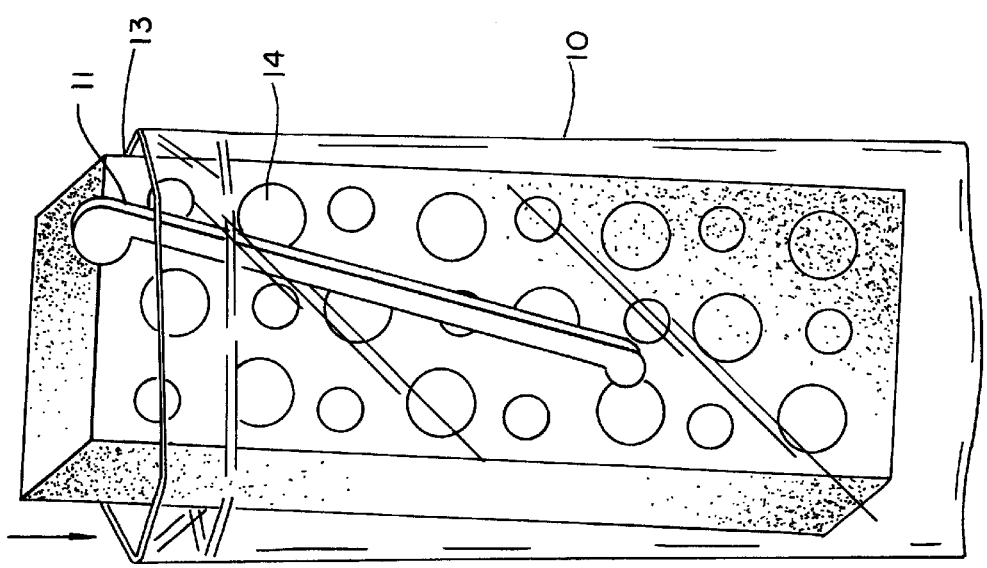
FIG. 1 is a perspective view of Kit for the Prevention of Residual Water of the present invention.

As depicted in FIG. 1 a residual water prevention kit 1 is illustrated in the form of a package or kit 10. Inside of the kit 10 is a insertion tool 11 and a mat display apparatus 13 comprising a plurality of removable blocking plugs 14. Each plug 14 is made of a predetermined size for use in pipes having different diameters.

Figure 2:
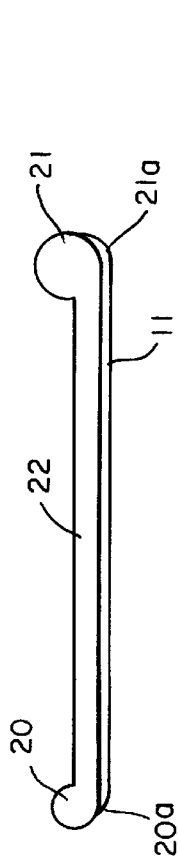
FIG. 2 is a perspective view of an insertion tool of the present invention.
Figure 3:
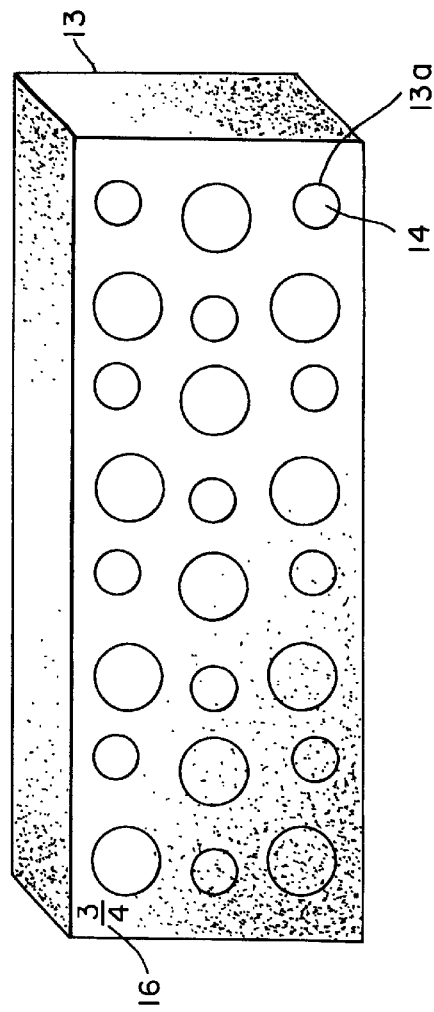
FIG. 3 is a perspective view of a mat display apparatus of the present invention.

The insertion tool of the present invention is shown in FIG. 2. The tool 11 may be made of metal, rubber or plastic and is integrally formed by molding or forging. The embodiment of the tool 11 illustrated in FIG. 2 has a first end 20 dimensioned to barely fit inside a ½ inch diameter pipe and a second end 21 dimensioned to barely fit inside a ¾ inch diameter pipe. The tool is about 8 inches in length and has a thickness of less than ½ inch. Each end 20, 21 have a round end effector 20a, 21a for manipulating and pushing a plug into position inside the pipe. The round end could be substituted by a square, rectangle or any shape that will effectively position the plug. Between and connecting each end 20, 21 is a handle section 2 for holding the tool during use.

As shown in FIG. 2, a mat display apparatus 13 and removable blocking plugs 14 are illustrated. The mat display 13a has been die cut to produce a scale 16 of a plurality of different sized plugs, each plug having a diameter so that the plug is compressed upon insertion into the pipe and expands upon release to block total residual fluid flow inside the pipe. Although only ½ inch and ¾ inch pipe plugs are illustrated, the mat display apparatus may have a scale 16 with indicia representing one or more different pipe diameters and the corresponding set of plugs. The plugs 14 may be formed and cut to different diameters to meet the different diameters of pipes used to control water flow. The material is generally compressible and resilient and the plugs remain within the mat display by a friction fit.

Figure 4:
FIG. 4 is a perspective view of an extruded, die cut, starch plug, able to disintegrate and dissolve, of the present invention.

FIG. 4 illustrates a plug 14 removed from the mat display 13a. The plug is flexible, long lasting in dry conditions, can be cut to the exact diameter of any pipe and is soluble and able to disintegrate in water.

The expanded starch material may be of various thicknesses but has a relatively low bulk density allowing it to readily dissolve and disintegrate. Unlike bread, the material is closed cell in structure. The uniform, closed cell structure of the product with its characteristic tiny bubble formation, not only results in a Styrofoam-like appearance and density, but gives it the necessary resilience and compressibility needed for using a predetermined quantity to effectively impede the flow of moisture and still readily dissolve and disintegrate. In the preferred embodiment, the composition of the plug contains starch having at least 45% and preferably at least 65% by weight amylose content. The preferred embodiment contains a plasticizer additive such as polyvinyl alcohol to aid in compressibility and resilience. Further the preferred embodiment is extruded, forming an expanded starch based material that is of low density, to aid in disintegration and solubility. This particular composition is described and claimed in U.S. Pat. Nos. 4,863,655, 5,035, 930 and 5,043,196 which are assigned to National Starch Inc. and these patents are hereby incorporated by reference.

The use of this composition as a residual water barrier has produced surprising results. The results show that a round cubic inch of the closed cell subject plug becomes soluble in water faster than a round cubic inch of open celled, compressed bread. The form of the closed cell structure allows it to remain resilient upon insertion and greatly reduces the bulk density of the effective plug mass. These qualities allow the plug to be conveniently inserted with a predetermined mass, facilitating proper degradation and solubility when water flow is resumed.

Figure 5:
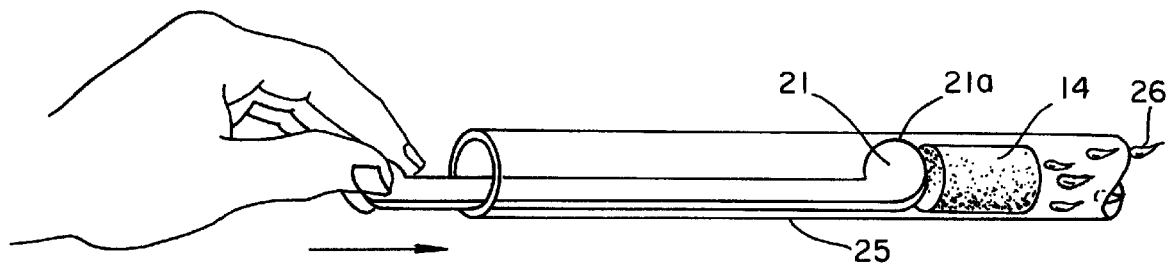
FIG. 5 is a cross sectional view of a pipe during the method of installing the plug of the present invention.
Figure 6:
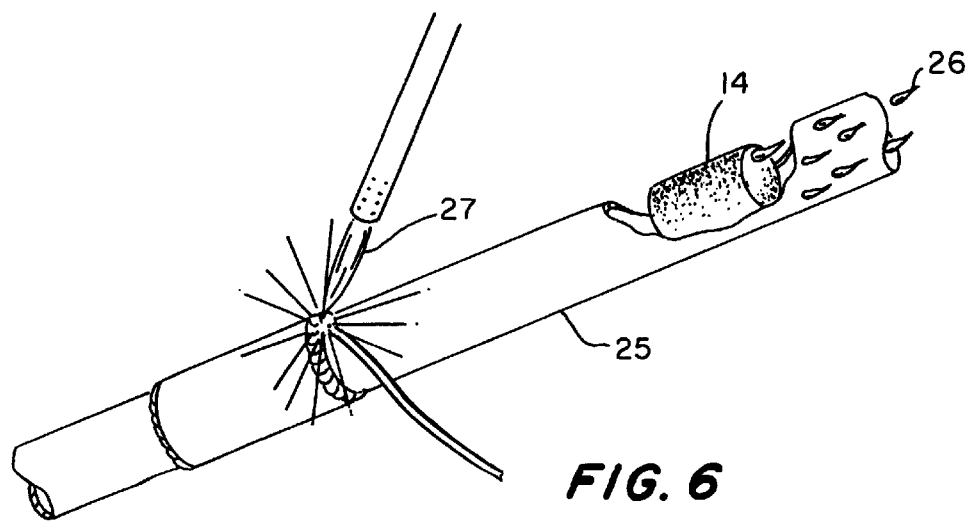
FIG. 6 is a cut out view and a perspective view of the method of the present invention.

In order to repair a water pipe 25, the water is shut off and all the remaining valves can be opened to drain the remaining water from the pipes. A section of pipe is next cut and removed leaving two or more open end sections of pipe. At this point, residual water 26 which has not drained from the pipes can gravitate to the area that where the section has been removed. As illustrated in FIG. 5, a plug 14 of the subject invention may then be placed into the end or ends of each section as necessary. The plug 14 is next positioned in the pipe 25 by positioning the insertion tool into each pipe end and pushing the plug 6–8 inches away from the area which has been selected for repair. As shown in FIG. 6, during the soldering process the heat can cause the residual water to vacuum towards the soldering flame 27. As the water flows towards the heat, the plug 14 will block the water from entering the repair area. The plug will block any residual water and yet is far enough from the heat so that the starch will not break down. Further, the residual water adjacent to the end of the plug still acts as a heat sink and thereby protects the plug. The plug eliminates the problems of generating adequate heat, prematurely dispersing flux and pin-hole leaks from steaming.

A major benefit is that total repair time is greatly reduced. After the joint has been sealed the water may be turned on without removing the plugs. The low density, expanded starch quickly disintegrates and dissolves into tiny particles with no chance of clogging or stopping the flow of water in the pipe.

In light of the above description, modifications within the scope of this invention may occur to those skilled in the art. The above description is intended to be exemplary only and the scope of the invention is defined by the following claims or their equivalents.

What is claimed is:

1. A method of preventing residual water from passing into an area selected for soldering, said method comprising the following steps, inserting a expanded starch plug into an open end of a pipe which has been substantially drained of water in order to block the flow of water into said area of said pipe selected for soldering, and soldering said selected area which is within 8 inches or less of said expanded starch plug.

2. A mat display apparatus made of material used for preventing the flow of residual water from passing into an area selected for soldering, said mat display apparatus comprising, a mat display, said mat display having a plurality of removable die cut plugs made of expanded amylose starch which disintegrate and dissolve upon contact with water, each plug having a predetermined diameter of less than 2 inches.

3. The mat display apparatus as recited in claim 2, wherein said mat display is provided with a scale of plugs having different diameters.

4. The mat display apparatus as recited in claim 2, wherein said mat display is made of closed cellular material.

5. The mat display apparatus as recited in claim 2, wherein said mat display is made of low density, expanded amylose starch.

6. The mat display apparatus as recited in claim 2, wherein each plug has a starch content of at least 45% by weight amylose starch.

7. The mat display apparatus as recited in claim 2, wherein each plug has a diameter relative to the size of pipe being repaired.

* * * * *